United States Patent
Horihata et al.

(10) Patent No.: US 8,896,275 B2
(45) Date of Patent: Nov. 25, 2014

(54) VEHICLE ROTARY ELECTRIC MACHINE CAPABLE OF SAFELY STARTING SYNCHRONOUS RECTIFICATION

(75) Inventors: Harumi Horihata, Nagoya (JP); Hideaki Nakayama, Tokoname (JP)

(73) Assignee: Denso Corporation, Kariya (JP)

( * ) Notice: Subject to any disclaimer, the term of this patent is extended or adjusted under 35 U.S.C. 154(b) by 535 days.

(21) Appl. No.: 13/235,732

(22) Filed: Sep. 19, 2011

(65) Prior Publication Data

US 2012/0068671 A1 Mar. 22, 2012

(30) Foreign Application Priority Data

Sep. 17, 2010 (JP) .................................. 2010-209487

(51) Int. Cl.
- H02P 9/00 (2006.01)
- H02P 9/48 (2006.01)
- H02J 7/14 (2006.01)

(52) U.S. Cl.
CPC ................ *H02J 7/1492* (2013.01); *H02P 9/48* (2013.01); *Y02T 10/92* (2013.01)
USPC .......................................................... 322/28

(58) Field of Classification Search
CPC ........... H02J 7/1492; H02P 9/48; Y02T 10/92
See application file for complete search history.

(56) References Cited

U.S. PATENT DOCUMENTS

| | | | |
|---|---|---|---|
| 8,513,924 B2* | 8/2013 | Horihata | 322/24 |
| 8,525,491 B2* | 9/2013 | Iwai | 322/28 |
| 8,541,988 B2* | 9/2013 | Horihata et al. | 322/21 |
| 8,547,071 B2* | 10/2013 | Horihata et al. | 322/21 |
| 8,564,255 B2* | 10/2013 | Nakayama et al. | 322/29 |
| 8,570,004 B2* | 10/2013 | Asada et al. | 322/45 |
| 8,716,966 B2* | 5/2014 | Nakayama et al. | 318/400.06 |
| 2008/0225565 A1 | 9/2008 | Tsujimoto et al. | |
| 2011/0215773 A1* | 9/2011 | Iwai | 322/28 |
| 2011/0255320 A1* | 10/2011 | Tabata et al. | 363/127 |
| 2012/0001598 A1* | 1/2012 | Horihata et al. | 322/21 |
| 2012/0007568 A1* | 1/2012 | Horihata et al. | 322/21 |
| 2012/0081083 A1* | 4/2012 | Horihata et al. | 322/99 |
| 2012/0086371 A1* | 4/2012 | Nakayama et al. | 318/400.06 |
| 2012/0091973 A1* | 4/2012 | Horihata | 322/29 |
| 2012/0098503 A1* | 4/2012 | Horihata et al. | 322/23 |

FOREIGN PATENT DOCUMENTS

| | | |
|---|---|---|
| JP | B2-4275704 | 6/2009 |
| JP | A-2010-110176 | 5/2010 |

* cited by examiner

*Primary Examiner* — Tulsidas C Patel
*Assistant Examiner* — S. Mikailoff
(74) *Attorney, Agent, or Firm* — Oliff PLC (57) ABSTRACT

A rotary electric machine for a vehicle that is capable of starting synchronous rectification through switching elements after having ensured absence of a short circuit fault. The rotary electric machine includes a multi-phase armature winding, a switching element set that includes a plurality of pairs of upper-arm and lower-arm switching elements to form a bridge rectification circuit together with the armature winding, an on/off-timing setter that sets on/off-timing of each switching element, a switching element driver that drives each switching element at the on/off-timing set by the on/off-timing setter; and a synchronous control start determiner that determines timing when an energization period for the upper-arm switching element and an energization period for the lower-arm switching element occur alternately as start timing of the synchronous rectification.

12 Claims, 8 Drawing Sheets

VEHICLE ROTARY ELECTRIC MACHINE CAPABLE OF SAFELY STARTING SYNCHRONOUS RECTIFICATION

CROSS-REFERENCE TO RELATED APPLICATION

This application is based on and claims the benefit of priority from earlier Japanese Patent Application No. 2010-209487 filed Sep. 17, 2010, the description of which is incorporated herein by reference.

BACKGROUND

1. Technical Field

This invention relates to a rotary electric machine for a vehicle such as a passenger car and a truck.

2. Related Art

A known power generator for a vehicle, as disclosed in Japanese Patent Application Publication No. 2010-110176, includes a power conversion device that is adapted to rectify an output voltage of an armature winding via a power converting section composed of a plurality of switching elements. In the disclosed power conversion device, it is diagnosed whether or not an upper arm switching element is on, for example, by checking (i) that its parasitic diode is in an on-state, (ii) that a gate command for the upper-arm switching element is ON, and (iii) that a phase voltage is within a predetermined range (equal to or lower than a threshold V4).

In the disclosed power conversion device, however, there is a disadvantage that although it can be determined whether or not each switching element is normally on just during an energization period of its parasitic diode, it cannot be reliably determined whether or not there has occurred an abnormality prior to start of the synchronous rectification, in particular, whether or not each switching element is short-circuited prior to start of the synchronous rectification.

Japanese Patent Application Publication No. 2010-110176 describes how to diagnose operation of each switching element after the synchronous rectification is started, but it is silent about a start condition for starting or restarting the synchronous rectification immediately after engine start or after suspension of the synchronous rectification from any cause. Inadvertent start of the synchronous rectification at timing when a phase voltage waveform is disturbed or when the switching element is short-circuited may lead to a short-circuit fault between terminals of a vehicle battery through the upper-arm and/or lower-arm circuit sections. Therefore, it is desirable to start the synchronous rectification after having ensured that such a short-circuit fault may not occur. In the absence of at least a short-circuit fault in the switching elements, the diode rectification can be performed even in the presence of an open fault, which enables power generation to be continued.

In consideration of the foregoing, exemplary embodiments of the present invention are directed to providing a rotary electric machine for a vehicle that is capable of starting synchronous rectification through switching elements after having ensured absence of a short circuit fault.

SUMMARY

In accordance with an exemplary aspect of the present invention, there is provided a rotary electric machine for a vehicle comprising: a multi-phase armature winding including two or more phase windings; a switching element set that rectifies a voltage induced in the armature winding, including a plurality of pairs of upper-arm and lower-arm switching elements, each switching element being electrically connected in parallel with a diode, the pairs of switching elements being electrically connected to the respective phase windings so as to form a bridge rectification circuit together with the phase windings; an on/off-timing setter that sets on/off-timing of each switching element; a switching element driver that drives each switching element at the on/off-timing set by the on/off-timing setter; and a synchronous control start determiner that determines timing when an upper-arm on-period and a lower-arm on-period for each pair of the switching elements occur alternately as start timing of synchronous rectification, the synchronous rectification being such that for each pair of switching elements the on/off-timing setter and the switching element driver cooperatively on/off-control the switching elements, the upper-arm on-period being an energization period for the upper-arm switching element from the time when a phase voltage of the corresponding phase winding reaches a first threshold to the time when the phase voltage of the corresponding phase winding reaches a second threshold, the lower-arm on-period being an energization period for the lower-arm switching element from the time when the phase voltage of the corresponding phase winding reaches a third threshold to the time when the phase voltage of the corresponding phase winding reaches a fourth threshold.

With this configuration, it is possible to start the synchronous rectification through the switching elements after having ensured that no short circuit fault is occurring in both the upper-arm switching element and the lower-arm switching element by detecting that the upper-arm on-period and the lower-arm on-period appear alternately.

DESCRIPTION OF SPECIFIC EMBODIMENTS

The present invention will be described more fully hereinafter with reference to the accompanying drawings. Like numbers refer to like elements throughout.

Figure 1:
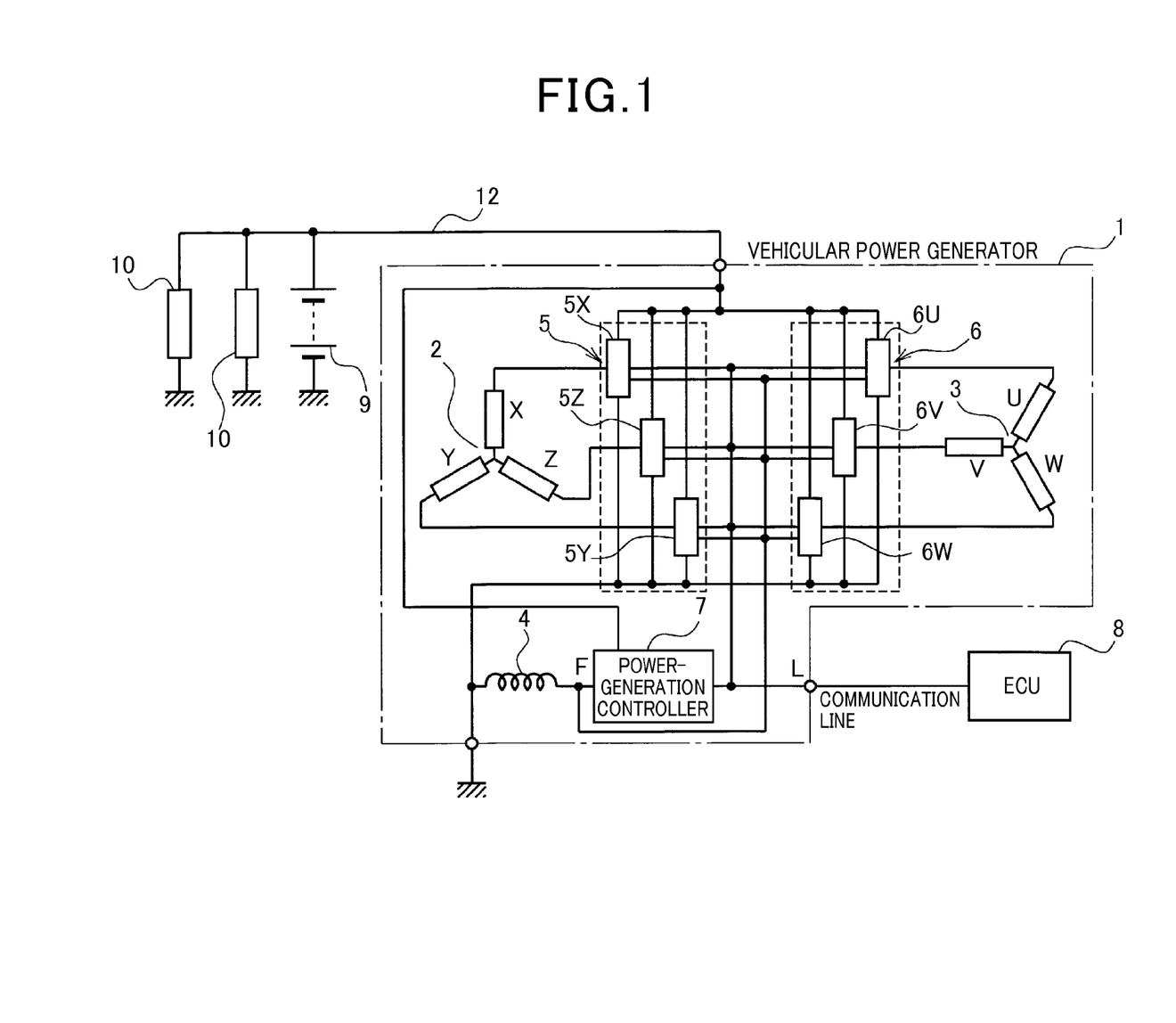
FIG. 1 shows a block diagram of a vehicular power generator in accordance with one embodiment of the present invention.

FIG. 1 shows a vehicular power generator for a vehicle in accordance with one embodiment of the present invention. The vehicular power generator 1 includes two stator windings (armature windings) 2, 3, a field winding 4, two rectifier module sets 5, 6, and a power-generation controller 7.

The stator winding 2, which is a multi-phase winding (e.g., a three-phase winding composed of X phase-winding, Y phase-winding, and Z phase-winding), is wound around a stator core (not shown). Similarly, the stator winding 3, which is also a multi-phase winding (e.g., a three-phase winding composed of U phase-winding, V phase-winding, and W phase-winding), is wound around the same stator core and positioned to be shifted by an electric angle of 30 degrees relative to the stator winding 2. In the present embodiment, the two stator winding 2, 3, and the stator core forms a stator.

The field winding 4 is wound around field poles (not shown) opposingly positioned on the inner periphery side of the stator core so as to form a rotor. The field poles are magnetized by an excitation current to thereby generate a rotating magnetic field which induces an alternating voltage in each stator winding 2, 3.

The rectifier module set 5 is electrically connected to the stator winding 2 to form a three-phase full wave rectifier circuit (bridge circuit), which circuit is operative to convert an alternating current induced in the stator winding 2 into a direct current. The rectifier module set 5 includes a specific number of rectifier modules 5X, 5Y, 5Z where the specific number is equal to a number of phases for the stator winding 2 (three in the case of the three-phase winding). The rectifier module 5X is electrically connected to the X phase-winding included in the stator winding 2. The rectifier module 5Y is electrically connected to the Y phase-winding included in the stator winding 2. The rectifier module 5Z is electrically connected to the Z phase-winding included in the stator winding 2.

On the other hand, the rectifier module set 6 is electrically connected to the stator winding 3 to form a three-phase full wave rectifier circuit (bridge circuit), which circuit is operative to convert an alternating current induced in the stator winding 3 into a direct current. The rectifier module set 6 includes a specific number of rectifier modules 6U, 6V, 6W where the specific number is equal to a number of phases for the stator winding 3 (three in the case of the three-phase winding). The rectifier module 6U is electrically connected to the U phase-winding included in the stator winding 3. The rectifier module 6V is electrically connected to the V phase-winding included in the stator winding 3. The rectifier module 6W is electrically connected to the W phase-winding included in the stator winding 3.

The power-generation controller 7 includes an excitation control circuit for controlling an excitation current that flows through the field winding 4 electrically connected to the excitation control circuit via a F-terminal, and is adapted to adjust the excitation current so that an output voltage (an output voltage of each rectifier module) $V_B$ of the vehicular power generator 1 is kept at a regulated voltage $V_{reg}$. More specifically, the power-generation controller 7 suspends supply of the excitation current to the winding 4 when the output voltage $V_B$ increases to be higher than the regulated voltage $V_{reg}$, and resumes the supply of the excitation current to the field winding 4 when the output voltage $V_B$ decreases to be lower than the regulated voltage $V_{reg}$, thereby controlling the output voltage $V_B$ to be kept at the regulated voltage $V_{reg}$. The power-generation controller 7 is electrically connected to an ECU 8 (external control device) via a communication terminal L through a communication line, transmits and/or receives communication messages in bidirectional serial communications with the ECU 8 (e.g., LIN-communications according to the LIN (Local Interconnect Network) protocol).

There will now be explained the rectifier module 5X in more detail.

Figure 2:
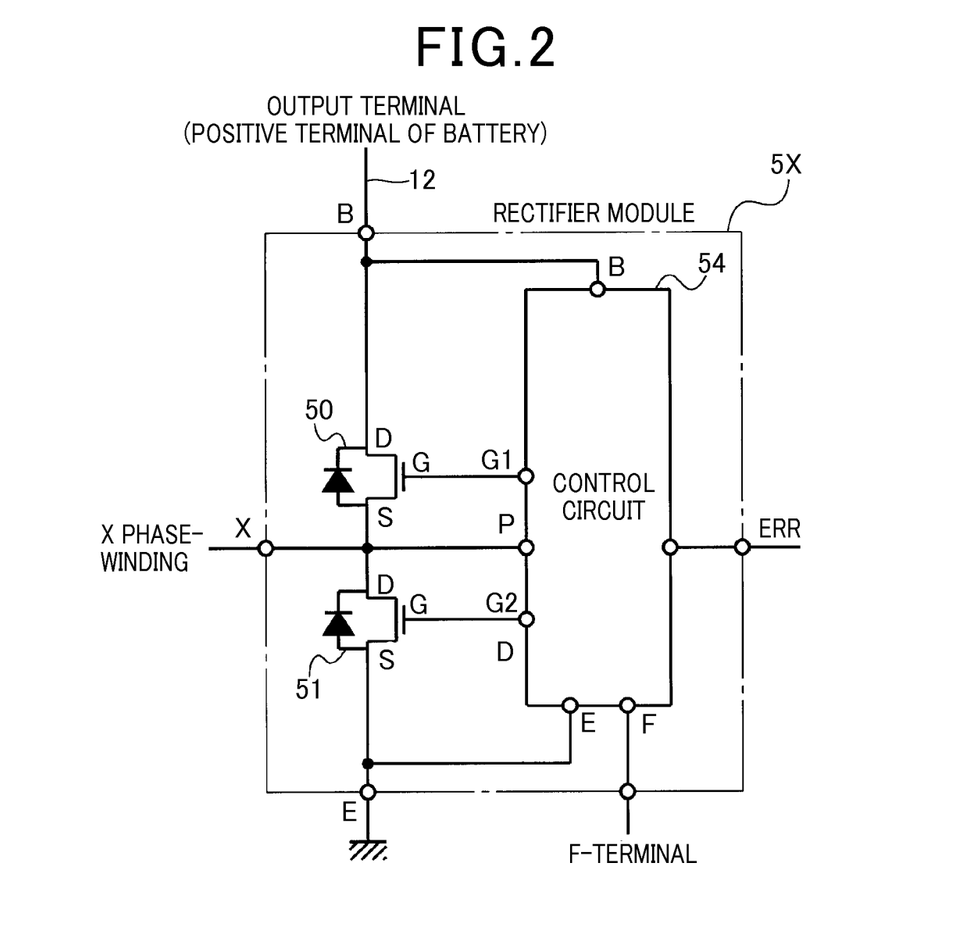
FIG. 2 shows a block diagram of a rectifier module in the vehicular power generator.

FIG. 2 shows a more detailed block diagram of the rectifier module 5X. The other rectifier modules 5Y, 5Z, 6U, 6V, 6W are similar in configuration. As shown in FIG. 2, the rectifier module 5X includes two MOS transistors 50, 51, and a control circuit 54. The MOS transistor 50 is an upper-arm (high-side) switching element. A source (S) of the MOS transistor 50 is electrically connected to the X phase-winding of the stator winding 2 and a drain (D) of the MOS transistor 50 is electrically connected to an electrical load 10 and/or a positive terminal of the battery 9 through a charging wire 12. The MOS transistor 51 is a lower-arm (low-side) switching element. A source (S) of the MOS transistor 51 is electrically connected to a negative terminal of the battery 9 (grounding wire) and a drain (D) of the MOS transistor 51 is electrically connected to the X phase-winding. The two MOS transistors 50, 51 are connected in series between the positive and negative terminals of the battery 9 where a connection point between the two MOS transistors 50, 51 is connected to the X phase-winding. For each MOS transistor 50, 51, a diode is connected in parallel with the MOS transistor between the source and the drain thereof. The diode for each MOS transistor 50, 51 may be implemented by a parasitic diode (body diode). Alternatively, for each MOS transistor 50, 51, an additional diode as an individual component other than the parasitic diode may be connected in parallel with the MOS transistor between the source and the drain thereof. At least either one of the upper-arm MOS transistor 50 and the lower-arm MOS transistor 51 may be replaced with another type of switching element.

Figure 3:
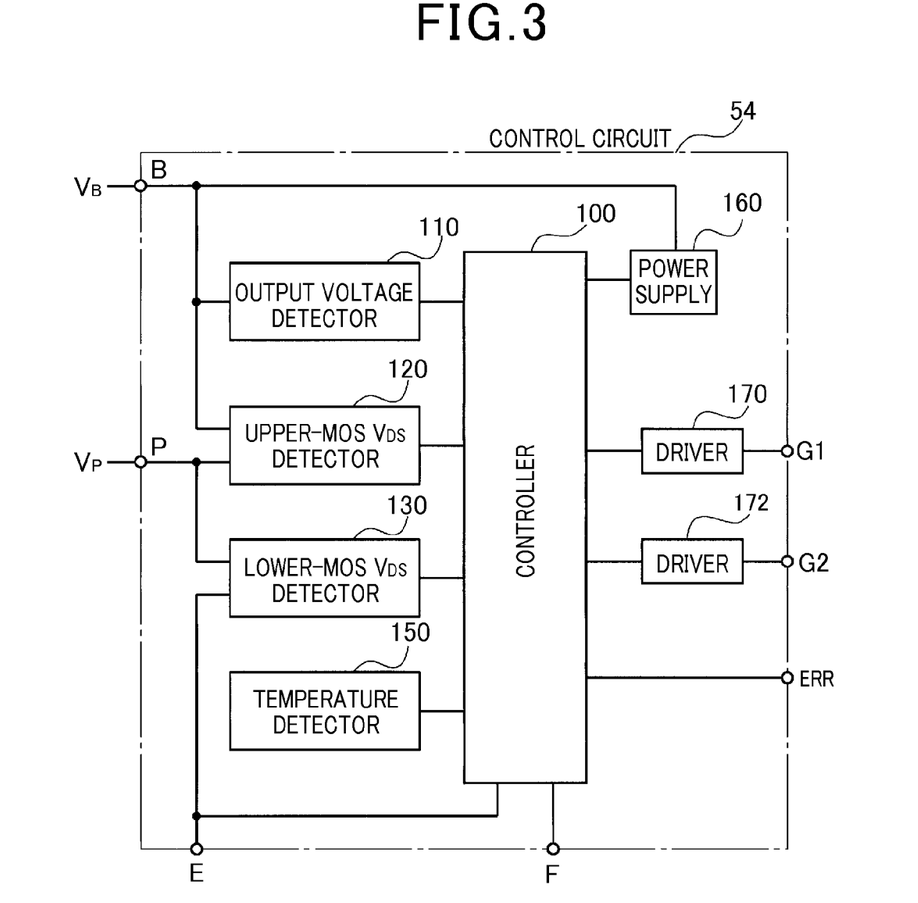
FIG. 3 shows a more detailed block diagram of a control circuit in the rectifier module.

FIG. 3 shows a more detailed block diagram of the control circuit 54. As shown in FIG. 3, the control circuit 54 includes a controller 100, a power supply 160, an output voltage detector 110, an upper-MOS $V_{DS}$ detector 120, a lower-MOS $V_{DS}$ detector 130, a temperature detector 150, drivers 170, 172.

The power supply 160 starts its operation at timing when the excitation current is supplied from the power-generation controller 7 to the field winding 4, then applies an operating voltage to each element included in the control circuit 54, and stops the supply of the operating voltage when the supply of the excitation current is stopped. The start and stop of the power supply 160 are to be conducted according to instructions from the controller 100.

The driver 170, whose output terminal (G1) is electrically connected to a gate of the high-side MOS transistor 50, generates a driving signal for turning on/off the MOS transistor 50. Similarly, the driver 172, whose output terminal (G2) is electrically connected to a gate of the low-side MOS transistor 51, generates a driving signal for turning on/off the MOS transistor 51.

The output voltage detector 110 includes, for example, a differential amplifier and an AD converter that converts outputted signal of the differential amplifier into digital data, and outputs data corresponding to a voltage on an output terminal (B-terminal) of the vehicular power generator 1 (or the rectifier module 5X). In some embodiments, the AD converter may be provided in the controller 100.

The upper-MOS $V_{DS}$ detector 120 detects a drain-source voltage $V_{DS}$ of the high-side MOS transistor 50, and compares the detected drain-source voltage $V_{DS}$ with a predetermined threshold to output a signal corresponding to the voltage comparison.

Figure 4:
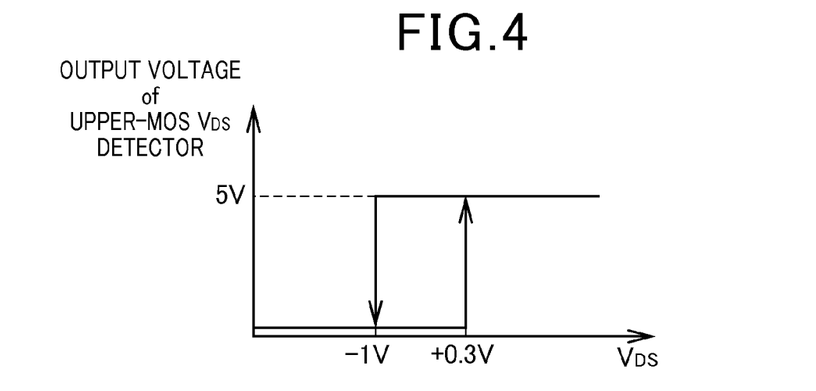
FIG. 4 shows an exemplary voltage comparison by the upper-MOS $V_{DS}$ detector in the control circuit.

FIG. 4 shows an exemplary voltage comparison by the upper-MOS $V_{DS}$ detector 120. In FIG. 4, the horizontal axis indicates the drain-source voltage $V_{DS}$ with reference to an output voltage $V_B$ on the drain side of the upper-arm MOS transistor 50. The vertical axis indicates a voltage level of an output signal of the upper-MOS $V_{DS}$ detector 120. As shown in FIG. 4, $V_{DS}$ becomes equal to or higher than 0.3 V in an increasing direction as the phase voltage $V_P$ increases to be higher than the output voltage $V_B$ by 0.3 V or more, which leads to a change in voltage level of the output signal of the upper-MOS $V_{DS}$ detector 120 from a lower voltage level (0 V) to a higher voltage level (5 V). Subsequently, $V_{DS}$ becomes equal to or lower than −1.0 V in a decreasing direction as the phase voltage $V_P$ decreases to be lower than the output voltage $V_B$ by 1.0 V or more, which leads to a change in voltage level of the output signal of the upper-MOS $V_{DS}$ detector 120 from the higher voltage level to the lower voltage level.

V10 that is 0.3 V higher than the output voltage $V_B$ (see FIG. 8) is a first threshold for securely detecting the start of the diode energization period, which threshold is set higher than the output voltage $V_B$ plus the drain-source on-voltage $V_{DS}$ of the MOS transistor 50 and lower than the output voltage $V_B$ plus a forward voltage $V_F$ of the diode connected in parallel with the MOS transistor 50. V20 that is 1.0 V lower than the output voltage $V_B$ (see FIG. 8) is a second threshold for securely detecting the end of the diode energization period, which threshold is set lower than the output voltage $V_B$.

The "on-period" on the upper-arm side is defined as a time period from the time when the phase voltage $V_P$ reaches the first threshold in the increasing direction to the time when the phase voltage $V_P$ subsequently reaches the second threshold in the decreasing direction. The start and end of the on-period respectively deviate from the start and end of the "diode energization period" that is a time period during which the diode is actually energized with the MOS transistor being kept in an off-state. The synchronous control of the present embodiment is implemented on the basis of the on-period.

The lower-MOS $V_{DS}$ detector 130 detects a drain-source voltage $V_{DS}$ of the low-side MOS transistor 51, and compares the detected drain-source voltage $V_{DS}$ with a predetermined threshold to output a signal corresponding to the voltage comparison.

Figure 5:
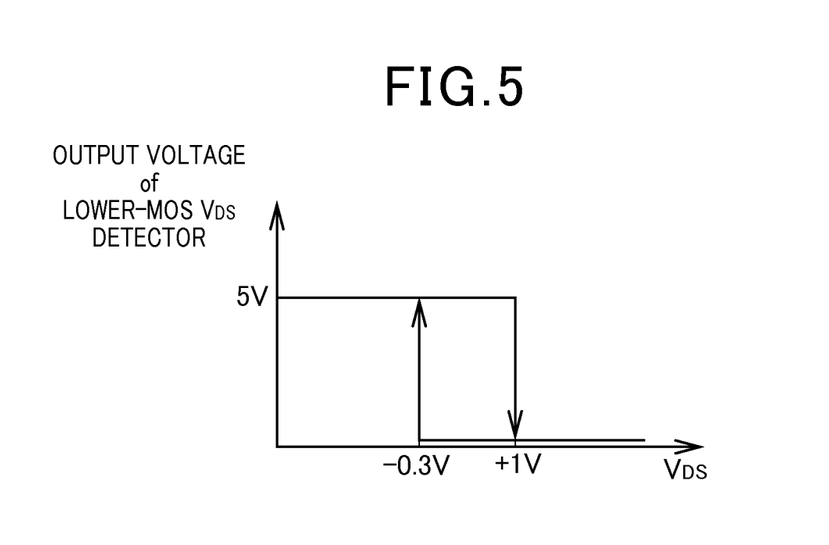
FIG. 5 shows an exemplary voltage comparison by the lower-MOS $V_{DS}$ detector in the control circuit.

FIG. 5 shows an exemplary voltage comparison by the lower-MOS $V_{DS}$ detector 130. In FIG. 5, the horizontal axis indicates the drain-source voltage $V_{DS}$ on the drain side with reference to a ground terminal voltage $V_{GND}$ that is a voltage on a negative terminal of the battery. The vertical axis indicates a voltage level of an output signal of the lower-MOS $V_{DS}$ detector 130. As shown in FIG. 5, $V_{DS}$ becomes equal to or lower than −0.3 V in a decreasing direction as the phase voltage $V_P$ decreases to be lower than the ground terminal voltage $V_{GND}$ by 0.3 V or more, which leads to a change in voltage level of the output signal of the lower-MOS $V_{DS}$ detector 130 from a lower level (0 V) to a higher voltage level (5 V). Subsequently, $V_{DS}$ becomes equal to or higher than 1.0 V in an increasing direction as the phase voltage $V_P$ increases to be higher than the ground terminal voltage $V_{GND}$ by 1.0 V or more, which leads to a change in voltage level of the output signal of the lower-MOS $V_{DS}$ detector 130 from the higher voltage level to the lower voltage level.

V11 that is 0.3 V lower than the ground terminal voltage $V_{GND}$ (see FIG. 8) is a third threshold for securely detecting the start of the diode energization period, which threshold is set lower than the ground terminal voltage $V_{GND}$ minus the drain-source on-voltage $V_{DS}$ of the MOS transistor 51 and higher than the ground terminal voltage $V_{GND}$ minus a forward voltage $V_F$ of the diode connected in parallel with the MOS transistor 51. V21 that is 1.0 V higher than the ground terminal voltage $V_{GND}$ (see FIG. 8) is a fourth threshold for securely detecting the end of the diode energization period, which threshold is set higher than the ground terminal voltage $V_{GND}$.

The "on-period" on the lower-arm side is defined as a time period from the time when the phase voltage $V_P$ reaches the third threshold in the decreasing direction to the time when the phase voltage $V_P$ subsequently reaches the fourth threshold in the increasing direction. It should be noted that the start and end of the on-period respectively deviate from the start and end of the "diode energization period" that is a time period during which the diode is actually energized with the MOS transistor being kept in an off-state. The synchronous control of the present embodiment is implemented on the basis of the on-period.

The temperature detector 150 detects a temperature of each of the MOS transistors 50, 51, for example, on the basis of a forward voltage of a diode disposed around the MOS transistor 50, 51, and outputs a high level signal for a high temperature and a low level signal for a low temperature. In some embodiments, the temperature detector 150 may be included in the controller 100.

Figure 6:
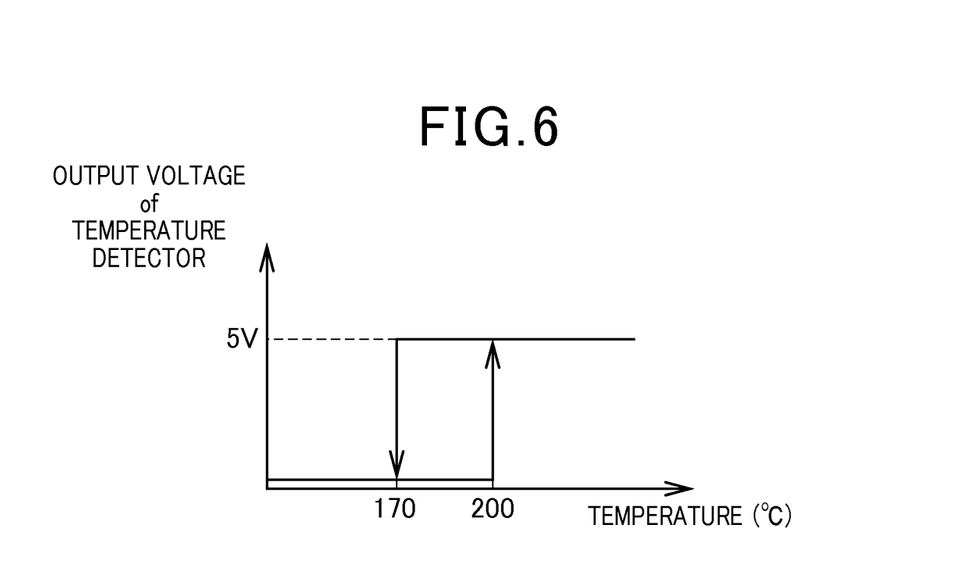
FIG. 6 shows an exemplary temperature detection by a temperature detector in the control circuit.

FIG. 6 shows an exemplary temperature detection by the temperature detector 150. In FIG. 6, the horizontal axis indicates a temperature (° C.). The vertical axis indicates a voltage level of an output signal of the temperature detector 150. As shown in FIG. 6, the output signal of the temperature detector 150 changes from a lower voltage level (0V) to a higher voltage level (5V) as the temperature increases to be equal to or higher than 200° C. And then, the output signal of the temperature detector 150 changes from the higher voltage level to the lower voltage level as the temperature decreases to be equal to or lower than 170° C.

The controller 100 is operative to determine timing for starting the synchronous rectification, set on/off-timing of each MOS transistor 50, 51 for performing the synchronous rectification, drive each driver 170, 172 according to the set on/off-timing, determine transition timing to load dump protection, and perform the load dump protection at the transition timing.

Figure 7:
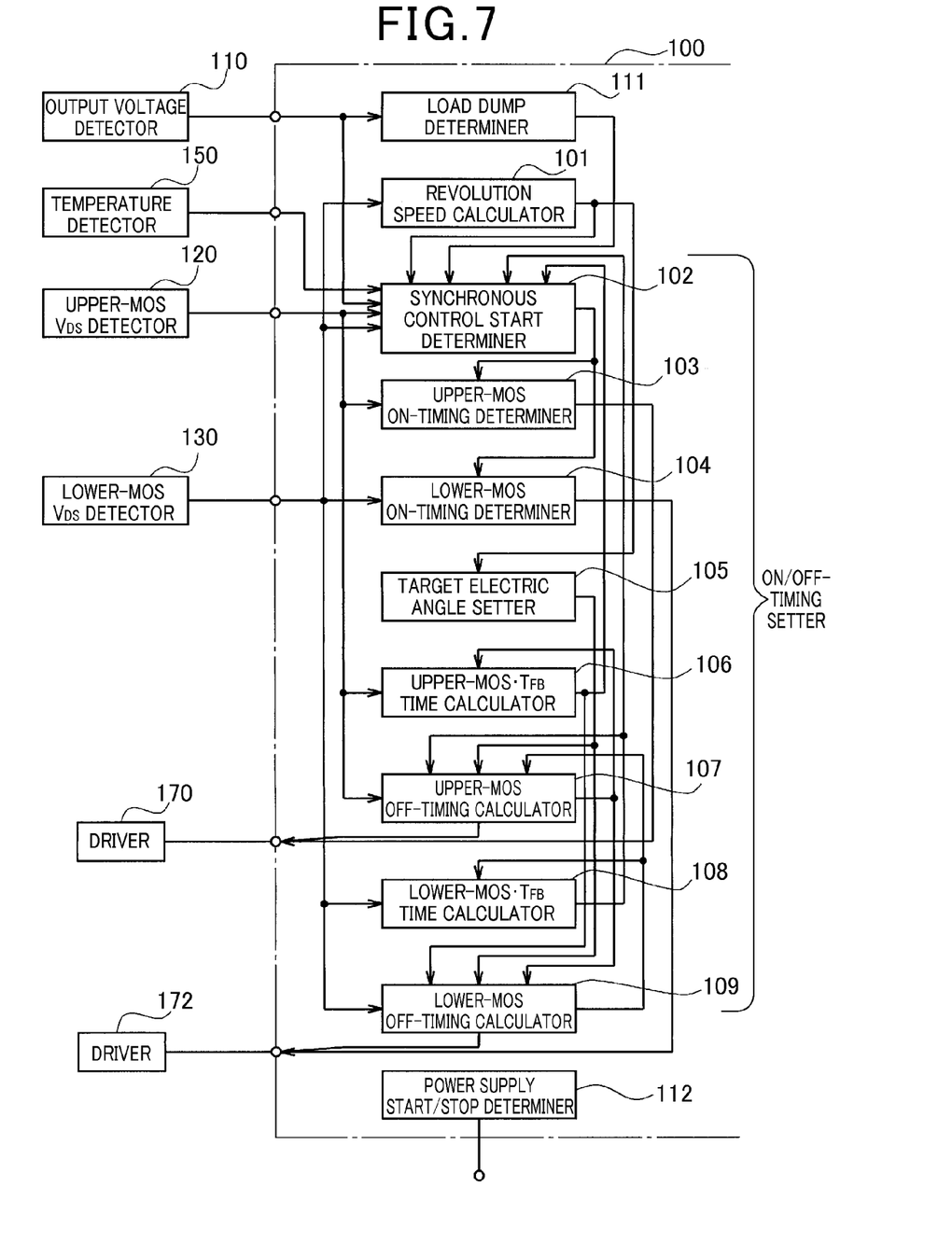
FIG. 7 shows a detailed block diagram of the controller in the control circuit.

FIG. 7 shows a detailed block diagram of the controller 100. As shown in FIG. 7, the controller 100 includes a revolution speed calculator 101, a synchronous control start determiner 102, an upper-MOS on-timing determiner 103, a lower-MOS on-timing determiner 104, a target electric angle setter 105, an upper-MOS·$T_{FB}$ time calculator 106, an upper-MOS off-timing calculator 107, a lower-MOS·$T_{FB}$ time calculator 108, a lower-MOS off-timing calculator 109, a load dump determiner 111, a power supply start/stop determiner 112. Configuration of each functional block may be implemented, for example, by a CPU running given operation programs stored in a memory, or may be implemented in hardware. More detailed configuration of each functional block will be described later.

There will now be explained operations to be performed by the rectifier module 5X in more detail. The other rectifier modules perform similar operations.

(1. Power Supply Start/Stop Determination)

The power supply start/stop determiner 112 checks for a pulse width modulation (PWM) signal (excitation current) that is supplied from an F-terminal of the power-generation controller 7 to the field winding 4, and instructs the power supply 160 to start its power supply upon continuation of output of the PWM signal for 30 μs (thirty microseconds). The power supply start/stop determiner 112 instructs the power supply 160 to stop its power supply upon continuation of output of the PWM signal for 1 s (one second). In this way, the start of supply of the excitation current to the field winding 4 triggers the rectifier module 5X to operate, and the stop of supply of the excitation current to the field winding 4 stops the operation of the rectifier module 5X. Therefore, the rectifier module 5X is in operation just during power generation of the vehicular power generator 1, which leads to effective prevention of wasted power consumption.

(2. Synchronous Control)

Figure 8:
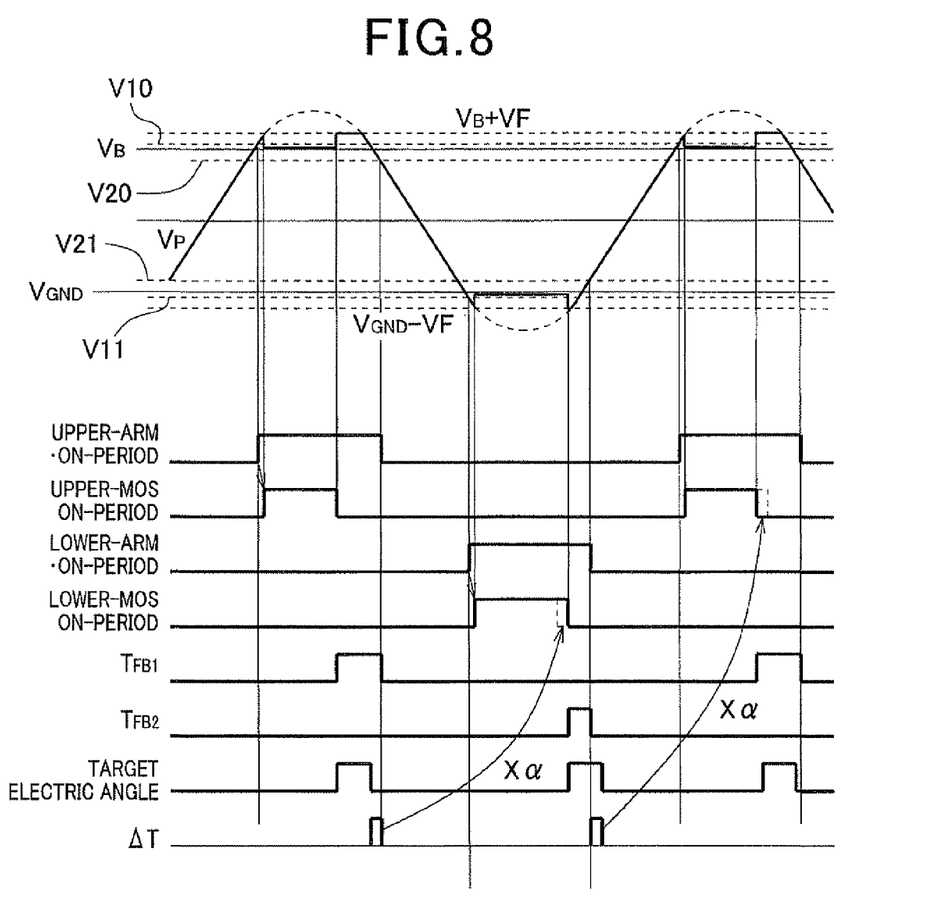
FIG. 8 shows a timing chart for synchronous rectification control to be performed by the controller.

FIG. 8 shows a timing chart for synchronous rectification control (synchronous control) to be performed by the controller 100. In FIG. 8, the "UPPER-ARM·ON-PERIOD" indicates an output signal of the upper-MOS $V_{DS}$ detector 120, the "UPPER-MOS ON-PERIOD" indicates on/off-timing of the high-side MOS transistor 50, the "LOWER-ARM ON-PERIOD" indicates an output signal of the lower-MOS $V_{DS}$ detector 130, and the "LOWER-MOS ON-PERIOD" indicates on/off-timing of the low-side MOS transistor 51. The remaining "$T_{FB1}$", "$T_{FB2}$", "TARGET ELECTRIC ANGLE", and "$\Delta T$" will be explained later.

The upper-MOS on-timing determiner 103 monitors the output signal (upper-arm·on-period) of the upper-MOS $V_{DS}$ detector 120, determines timing of a rising edge of the output signal from the low voltage level to the high voltage level as on-timing of the high-side MOS transistor 50, and transmits a turn-on instruction to the driver 170, which in turn turns on the MOS transistor 50 in response to the instruction.

The upper-MOS off-timing calculator 107 determines the time when a predetermined time period has elapsed after the turn-on of the high-side MOS transistor 50 as off-timing of the high-side MOS transistor 50, and then transmits a turn-off instruction to the driver 170, which in turn turns off the high-side MOS transistor 50 in response to the instruction.

The predetermined time period for determining the off-timing of the high-side MOS transistor 50 is variably set on a case-by-case basis so as to be a "target electric angle" before the end of the upper-arm·on-period (time point when the output signal of the upper-MOS VDS detector 120 falls from the high voltage level to the low voltage level).

The target electric angle is a margin for the off-timing of the MOS transistor 50 to be securely followed by the end of the diode energization period, where the diode energization period is an energization period of the corresponding diode in the diode rectification with the MOS transistor 50 being always in an off-state. The margin is set by the target electric angle setter 105. The target electric angle setter 105 sets the target electric angle on the basis of a revolution speed calculated by the revolution speed calculator 101. The target electric angle may be constant regardless of the revolution speed. More preferably, the target electric angle may be set larger in low and high revolution speed regions than in an intermediate region therebetween.

The revolution speed calculator 101 is configured to calculate a revolution speed on the basis of a cycle of a rising or trailing edge of an output signal of the lower-MOS $V_{DS}$ detector 130. Use of the output signal of the lower-MOS $V_{DS}$ detector 130 leads to stable detection of the revolution speed of the vehicular power generator 1 without being affected by fluctuation in output voltage $V_B$.

Similarly, the lower-MOS on-timing determiner 104 monitors an output signal (lower-arm·on-period) of the lower-MOS $V_{DS}$ detector 130, determines timing of a rising edge of the output signal of the lower-MOS $U_{DS}$ detector 130 from the low voltage level to the high voltage level as on-timing of the low-side MOS transistor 51, and transmits a turn-on instruction to the driver 172, which in turn turns on the low-side MOS transistor 51 in response to the instruction.

The lower-MOS off-timing calculator 109 determines the time when a predetermined time period has elapsed after the turn-on of the low-side MOS transistor 51 as off-timing of the low-side MOS transistor 51, and then a turn-off instruction to the driver 172, which in turn turns off the low-side MOS transistor 51 in response to the instruction.

The predetermined time period for determining the off-timing of the low-side MOS transistor 51 is variably set on a case-by-case basis so as to be a "target electric angle" before the end of the lower-arm·on-period (time point when the output signal of the lower-MOS VDS detector 130 falls from the high voltage level to the low voltage level).

The target electric angle is a margin for the off-timing of the MOS transistor 51 to be securely followed by the end of the diode energization period, where the diode energization period is an energization period of the corresponding diode in the diode rectification with the MOS transistor 51 being always in an off-state. The margin is set by the target electric angle setter 105.

In practice, the end of the upper-arm-on-period and the end of the lower-arm·on-period are unknown at the time of the turn-off of the MOS transistors 50, 51. Therefore, the upper-MOS off-timing calculator 107 and the lower-MOS off-timing calculator 109 feeds back half-cycle prior information to each other, which leads to enhancement of off-timing setting accuracy for the MOS transistors 50, 51.

For example, the off-timing of the high-side MOS transistor 50 is set as follows. The lower-MOS·$T_{FB}$ time calculator 108 calculates a half-cycle prior time-period $T_{FB2}$ from the turn-off of the low-side MOS transistor 51 to the end of the lower-arm·on-period (see FIG. 8). The upper-MOS off-timing calculator 107 calculates $\Delta T$ by subtracting the target electric angle from the calculated time period $T_{FB2}$. Without fluctuation in revolution of the rotor, $T_{FB2}$ would be equal to the target electric angle, which could lead to $\Delta T=0$. However, in most cases, $\Delta T$ is not zero, which is caused by (i) fluctuation in revolution of the rotor due to acceleration and deceleration of a vehicle, (ii) pulsing motion due to engine rotation, (iii) fluctuation in electrical load, (iv) variation in operating clock cycle when the controller 100 is implemented by running given programs, and (v) turn-off delay from transmission of the turn-off instruction to the driver 170, 172 to actual turn-off of the MOS transistor 50, 51. The acronym "FB" appearing in the symbols "$T_{FB}$ and $T_{FB2}$ stands for feed-back.

The upper-MOS off-timing calculator 107 modifies the lower-MOS on-period used in the lower-MOS off-timing calculator 109 one half-cycle before on the basis of $\Delta T$ to set the subsequent upper-MOS on-period to determine the off-timing of the high-side MOS transistor 50. More specifically, given a correction coefficient $\alpha$(alpha), the upper-MOS on-period is given by the following equation.

(upper-MOS on-period)=(half-cycle prior lower-MOS on-period)+$\Delta T \times \alpha$ Similarly, the off-timing of the low-side MOS transistor 51 is set as follows. The upper-MOS·$T_{FB}$ time calculator 106 calculates a half-cycle prior time-period $T_{FB1}$ from the turn-off of the high-side MOS transistor 50 to the end of the upper-arm·on-period (see FIG. 8). The lower-MOS off-timing calculator 109 calculates $\Delta T$ by subtracting the target electric angle from the calculated time period $T_{FB1}$. The lower-MOS off-timing calculator 109 modifies the upper-MOS on-period used in the upper-MOS off-timing calculator 107 one half-cycle before on the basis of $\Delta T$ to set the subsequent lower-MOS on-period, and determines the off-timing of the MOS transistor 51. More specifically, given a correction coefficient $\alpha$(alpha), the lower-MOS on-period is given by the following equation.

(lower-MOS on-period)=(half-cycle prior upper-MOS on-period)+$\Delta T \times \alpha$ In this way, in the synchronous rectification, the high-side MOS transistor 50 and the low-side MOS transistor 51 are alternately turned on at the same cycle as in the diode rectification, which leads to low-loss rectification through the MOS transistors 50, 51.

(3. Synchronous Control Start Determination)

There will now be explained start determination of the aforementioned synchronous control. Immediately after the activation of the rectifier module 5X or others, or after the synchronous control is suspended due to a certain abnormality, the synchronous control is started when one or more predetermined synchronous control start conditions are fulfilled. The synchronous control start determiner 102 determines whether or not the synchronous control start conditions are fulfilled. Once the synchronous control start conditions are fulfilled, the synchronous control start determiner 102 transmits a notification of fulfillment to the upper-MOS on-timing determiner 103 and the lower-MOS on-timing determiner 104. Subsequently, the synchronous control is performed, where the MOS transistors 50, 51 are alternately turned on.

The synchronous control start conditions are as follows.

(i) The upper-arm·on-period and the lower-arm·on-period (FIG. 8) alternately occur 32 consecutive times. Given an eight-pole rotor, the 32 consecutive times correspond to two cycles of mechanical angle. Alternatively, the upper-arm-on-period and the lower-arm·on-period may alternately occur 16 consecutive times which correspond to one cycle of mechanical angle, 16×(three or more) consecutive times which correspond to three or more cycles of mechanical angle, or a number of consecutive times other than 16N consecutive times (N: an positive integer).

(ii) The output voltage $V_B$ is within a normal range that is higher than 7V (lower limit) and lower than 18V (upper limit) in the 12V-based vehicle system. The normal range may be variably set according to a used type of system. For example, in the 24V-based vehicle system, the lower limit and the upper limit of the normal range are required to be changed according to a generated voltage of the vehicular power generator.

(iii) The MOS transistors 50, 51 are not overheated (or superheated).

(iv) The load dump protection is not in operation.

(v) A variation in output voltage $V_B$ per predetermined time period is smaller than 0.5V/200 μs. Tolerance for the variation in output voltage $V_B$ per predetermined time period after the start of the synchronous control depends on used elements and programs. Therefore, the tolerance for the variation in output voltage $V_B$ per predetermined time period may be suitably changed as a function of the used elements and programs.

(vi) $T_{FB1}$ and $T_{FB2}$ are both larger than 15 μs that is a threshold under which it can be considered that there exists an abnormality. The threshold depends on causes of abnormality. Therefore, the threshold (15 μs) may be suitably changed depending on the causes of abnormality. In the above, there has been explained that $T_{FB1}$ and $T_{FB2}$ are calculated by the upper-MOS·$T_{FB}$ time calculator 106 and the lower-MOS·$T_{FB}$ time calculator 108 respectively during the synchronous control. However, $T_{FB1}$ and $T_{FB2}$ are calculated before the start of the synchronous control as well as during the synchronous control, and are used in the start determination of the synchronous control.

Figure 9:
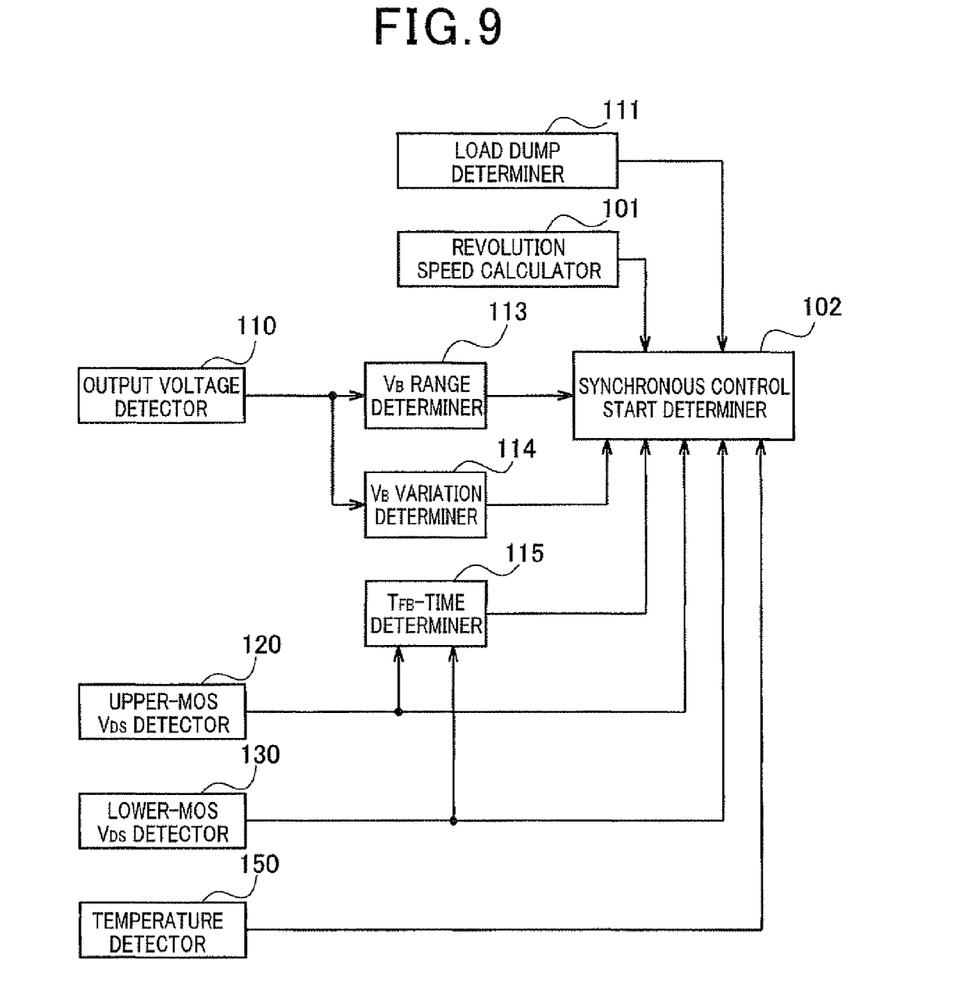
FIG. 9 shows a block diagram for synchronous control start determination to be performed by the controller.

FIG. 9 shows a block diagram for performing the synchronous control start determination. The load dump determiner 111 detects a load dump such that a surge voltage occurs upon disconnection of the battery terminal or the output terminal of the vehicular power generator 1 when the output voltage $V_B$ exceeds 20V, and in cases where the load dump is detected, transmits an instruction to the driver 170 for turning off the high-side MOS transistor 50 and an instruction to the driver 171 for turning on the low-side MOS transistor 51 to start the load dump protection. The load dump determiner 111 terminates the load dump protection when the output voltage $V_B$ that has been temporarily beyond 20V decreases lower than 17V. To prevent another surge voltage from occurring upon turn-on/off of the MOS transistor 50, 51 at the start or the termination of the load dump protection, the load dump protection determiner 111 is adapted to start or terminate the load dump protection during a lower-arm·on-period as shown in FIG. 8. The load dump determiner 111 outputs to the synchronous control start determiner 102 a high voltage level signal while the load dump protection is in operation and a low voltage level signal while the load dump protection is not in operation.

The $V_B$ range determiner 113 determines whether or not the output voltage $V_B$ detected by the output voltage detector 110 is within the range that is larger than 7V and smaller than 18V. If the output voltage $V_B$ is within the range, the $V_B$ range determiner 113 outputs a low voltage level signal. If the output voltage $V_B$ is not included in the range (i.e. $V_B$ is equal to or lower than 7V, or equal to or higher than 18V), the $V_B$ range determiner 113 outputs a high voltage level signal. The $V_B$ variation determiner 114 determines whether or not a variation in output voltage $V_B$ per predetermined time period detected by the output voltage detector 110 is smaller than 0.5V/200 μs. If the variation in output voltage $V_B$ per predetermined time period is smaller than 0.5V/200 μs, the $V_B$ variation determiner 114 outputs a low voltage level signal. If the fluctuation is equal to or larger than 0.5V/200 μs, the $V_B$ variation determiner 114 outputs a high voltage level signal. The $T_{FB}$-time determiner 115 determines whether or not $T_{FB1}$ detected by the upper-MOS·$T_{FB}$ time calculator 106 and $T_{FB2}$ detected by the lower-MOS·$T_{FB}$ time calculator 108 are both larger than 15 μs. If $T_{FB1}$ and $T_{FB2}$ are both larger than 15 μs, the $T_{FB}$-time determiner 115 outputs a low voltage level signal. If either one or both of $T_{FB1}$ and $T_{FB2}$ are equal to or smaller than 15 μs, the $T_{FB}$-time determiner 115 outputs a high voltage level signal.

In FIG. 9, the $V_B$ range determiner 113, the $V_B$ variation determiner 114, and the $T_{FB}$-time determiner 115 are provided outside the synchronous control start determiner 102. Alternatively, the $V_B$ range determiner 113, the $V_B$ variation determiner 114, the $T_{FB}$-time determiner 115 may be included in the synchronous control start determiner 102. In the present embodiment, the synchronous control is started when all the start conditions (i) to (vi) are fulfilled. Alternatively, the synchronous control may be started when a combination of the start conditions (i) and at least either one of the conditions (ii) to (vi) are fulfilled.

Figure 10:
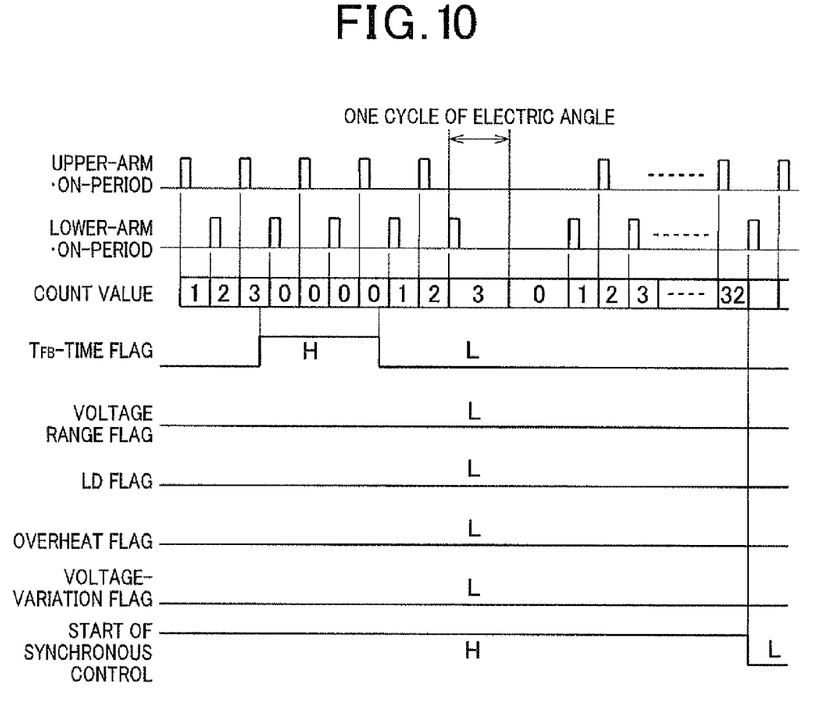
FIG. 10 shows a timing chart for the synchronous control start determination.

FIG. 10 shows a timing chart for the synchronous control start determination. In FIG. 10, the "COUNT VALUE" indicates a counting number of the rising edges (start timing) of the upper-arm·on-period and the lower-arm·on-period that occur alternately, the "$T_{FB}$-TIME FLAG" indicates the output signal of the $T_{FB}$-time determiner 115, the "VOLTAGE RANGE FLAG" indicates the output signal of the $V_B$ range determiner 113, the "LD FLAG" indicates the output signal of the load dump determiner 111, the "OVERHEAT FLAG" indicates the output signal of the temperature detector 150, and the "VOLTAGE-VARIATION FLAG" indicates the output signal of the $V_B$ variation determiner 114.

The synchronous control start determiner 102 counts consecutive rising edges of the upper-arm and lower-arm on-periods that occur alternately. Once the count value has reached "32", the synchronous control start determiner 102 inputs a signal indicative of start of the synchronous control (a low voltage level signal indicates start of the synchronous control, and a high voltage level signal indicates stop of the synchronous control) to the upper-MOS on-timing determiner 103 and the lower-MOS on-timing determiner 104. Upon input of the signal indicative of start of the synchronous control to the upper-MOS on-timing determiner 103 and the lower-MOS on-timing determiner 104, the synchronous control is started in which the MOS transistor 50, 51 are turned on alternately.

The synchronous control start determiner 102 continues to count the rising edges, provided as count continuation conditions that a time interval between consecutive rising edges of the upper-arm·on-period and the lower-arm·on-period is equal to or smaller than one cycle of electric angle, and that all the outputs of the $T_{FB}$-time determiner 115, the $V_B$ range determiner 113, the load dump determiner 111, the temperature detector 150, and the $V_B$ variation determiner 114 (the $T_{FB}$-time flag, the voltage range flag, the LD flag, the overheat flag, the voltage-variation flag) are at a low voltage level.

On the other hand, in case a time interval between consecutive rising edges of the upper-arm on-period and the lower-arm·on-period exceeds one cycle of electric angle before the count value reaches 32, and/or in case at least one of the outputs of the $T_{FB}$-time determiner 115, the $V_B$ range determiner 113, the load dump determiner 111, the temperature detector 150, the $V_B$ variation determiner 114 reaches a high voltage level before the count value reaches 32, the synchronous control start determiner 102 sets the count value to zero, and then resumes counting of the rising edges when the above count continuation conditions are fulfilled.

In this way, in the vehicular power generator 1 of the present embodiment, it becomes possible to start the synchronous rectification after having ensured that there exists no short-circuit fault in both the upper-arm (high-side) MOS transistor 50 and the lower-arm (low-side) MOS transistor 51 by detecting that the upper-arm on-period and the lower-arm on-period occur alternately.

In particular, timing when a time interval between two consecutive on-periods is equal to or smaller than one cycle of electric angle may be determined as the start timing of the synchronous rectification, which leads to more reliable determination that there exists no short-circuit fault in the MOS transistor 50, 51. Additionally or alternatively, timing when a number of times the upper-arm on-period and the lower-arm on-period appear alternately becomes equal to or larger than a number of times the upper-arm and lower-arm energization periods appear alternately during one cycle of mechanical angle may be determined as the start timing of the synchronous rectification, which makes it possible to check not only for a short-circuit fault occurring in the MOS transistors 50, 51, but also for an abnormality occurring in the magnetic circuit through monitoring a waveform of phase voltage during one revolution of the rotor.

Additionally or alternatively, timing when the output voltage $V_B$ is within the normal range may be determined as the start timing of the synchronous rectification, which makes it possible to avoid starting the synchronous control when the output voltage $V_B$ is beyond or below the normal range. Additionally or alternatively, timing when no overheating abnormal condition is detected may be determined as the start timing of the synchronous rectification, which makes it possible to avoid starting the synchronous control during abnormal heat generation. Additionally or alternatively, timing when the load dump protection is not in operation may be determined as the start timing of the synchronous rectification, which makes it possible to avoid starting the synchronous control during the load dump protection.

A large variation in on-period due to a large variation in output voltage $V_B$ per predetermined time period makes it difficult to accurately set on/off-timing (particularly, off-timing) of the MOS transistor 50. Avoiding starting the synchronous control in such a case leads to avoidance of erroneous setting of the on/off-timing of the MOS transistor 50.

Additionally or alternatively, timing when a time period from the off-timing of the MOS transistor 50, 51 to the end of the energization period ($T_{FB1}$, $T_{FB2}$) is larger than a predetermined value may be determined as the start timing of the synchronous rectification. In case $T_{FB1}$ and/or $T_{FB2}$ are extremely short, it may be considered that there exists an abnormality. Avoiding starting the synchronous control in such a case leads to avoidance of erroneous setting of the on/off-timing of the MOS transistor 50, 51.

(Modifications)

In the above embodiment, the vehicular power generator 1 is configured to include the two stator windings 2, 3 and the two rectifier module sets 5, 6. The present invention can be applied to an alternative power generator that includes one of the two stator windings and one of the two rectifier module sets.

In the above embodiment, the rectification (power generation) is performed by using the rectifier modules 5X, 5Y, etc. The present invention can be applied to a rotary electric machine for a vehicle that provides motor drive through the stator windings 2, 3 being supplied with an alternating current obtained by alternating on/off-timing of the MOS transistors 50, 51 to invert a direct current applied by the battery 9.

In the above embodiment, each of the two rectifier module sets 5, 6 includes three rectifier modules. Alternatively, each of the two rectifier module sets 5, 6 may include more or less than three rectifier modules.

As described above, according to the present invention, it is possible to start the synchronous rectification through the MOS transistors 50, 51 after having ensured that any short circuit fault is not occurring in both the upper-arm MOS transistor 50 and the lower-arm MOS transistor 51 by detecting that the upper-arm on-period and the lower-arm on-period occur alternately.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A rotary electric machine for a vehicle comprising:
a multi-phase armature winding including a plurality of phase windings that are out of phase with each other;
a plurality of pairs of upper-arm and lower-arm switching elements that form a bridge rectification circuit together with the multi-phase armature winding to rectify a voltage induced in the multi-phase armature winding, the plurality of pairs corresponding one-to-one to the plurality of phase windings, each switching element of the plurality of pairs of upper-arm and lower-arm switching elements being electrically connected in parallel with a diode;
an on/off-timing setter for each pair of the plurality of pairs of upper-arm and lower-arm switching elements, the on/off timing setter being configured to set, for each switching element of the pair of upper-arm and lower-arm switching elements, on and off timings at which the switching element is to be turned on and off, respectively;

a pair of first and second switching element drivers for each pair of the plurality of pairs of upper-arm and lower-arm switching elements, the first switching element driver being configured to turn on and off the upper-arm switching element of the pair of upper-arm and lower-arm switching elements at the on and off timings set by the on/off-timing setter, respectively, and the second switching element driver being configured to turn on and off the lower-arm switching element driver of the pair of upper-arm and lower-arm switching elements at the on and off timings set by the on/off-timing setter, respectively; and a synchronous control start determiner for each pair of the plurality of pairs of upper-arm and lower-arm switching elements, the synchronous control start determiner being configured to determine whether or not an upper-arm on-period and a lower-arm on-period occur in alternating order, and when the upper-arm on-period and the lower-arm on-period occur in alternating order, then determine that it is time to start synchronous rectification in which the pair of upper-arm and lower-arm switching elements are on/off controlled by the on/off-timing setter and the pair of first and second switching element drivers, the upper-arm on-period being an energization period for the upper-arm switching element from when a phase voltage of a corresponding phase winding that is the phase winding corresponding to the pair of upper-arm and lower-arm switching elements reaches a first threshold to when the phase voltage of the corresponding phase winding reaches a second threshold, and the lower-arm on-period being an energization period for the lower-arm switching element from when the phase voltage of the corresponding phase winding reaches a third threshold to when the phase voltage of the corresponding phase winding reaches a fourth threshold.

2. The rotary electric machine according to claim 1, wherein the synchronous control start determiner is further configured to determine whether or not the upper-arm on-period and lower-arm on period occur in alternating order by counting starts of the upper-arm and lower-arm on-periods.

3. The rotary electric machine according to claim 1, wherein the synchronous control start determiner is further configured to determine whether or not a time interval between starts of two consecutive upper-arm and lower-arm on-periods is equal to or smaller than one cycle of electric angle, and when the time interval between two consecutive on-periods is equal to or smaller than one cycle of electric angle, then determine that it is time to start the synchronous rectification.

4. The rotary electric machine according to claim 3, wherein the synchronous control start determiner is further configured to determine whether or not a number of times the upper-arm on-period and the lower-arm on-period occur in alternating order during one cycle of mechanical angle becomes equal to or more than a predetermined number of times that is a number of times the upper-arm on-period and the lower-arm on-period would normally occur in alternating order during one cycle of mechanical angle, and when the number of times the upper-arm on-period and lower-arm on-period occur in alternating order during one cycle of mechanical angle becomes equal to or more than the predetermined number of times, then determine that it is time to start the synchronous rectification.

5. The rotary electric machine according to claim 1, wherein the synchronous control start determiner is further configured to determine whether or not an output voltage on an output terminal connected to a vehicle battery is within a predetermined normal range of the output voltage, and when the output voltage is within the predetermined normal range of the output voltage, then determine that it is time to start the synchronous rectification.

6. The rotary electric machine according to claim 1, further comprising an overheat abnormality detector for each pair of the plurality of pairs of upper-arm and lower-arm switching elements, the overheat abnormality detector being configured to detect an overheating abnormal condition in the pair of upper-arm and lower-arm switching elements, wherein the synchronous control start determiner is further configured to determine whether or not the overheat abnormality detector has detected the overheating abnormal condition in the pair of upper-arm and lower-arm switching elements, and when the overheat abnormality detector has not detected any overheating abnormal condition in the pair of upper-arm and lower-arm switching elements, then determine that it is time to start the synchronous rectification.

7. The rotary electric machine according to claim 1, further comprising a load dump protector for each pair of the plurality of pairs of upper-arm and lower-arm switching elements, the load dump protector being configured to perform load dump protection through turning on the lower-arm switching element of the pair of upper-arm and lower-arm switching elements when an output voltage on an output terminal connected to a vehicle battery exceeds a reference voltage beyond which a surge voltage is likely to occur, thereby decreasing the output voltage, wherein the synchronous control start determiner is further configured to determine whether or not the load dump protector is not in operation, and when the load dump protector is not in operation, then determine that it is time to start the synchronous rectification.

8. The rotary electric machine according to claim 1, wherein the synchronous control start determiner is further configured to determine whether or not a variation in output voltage on an output terminal connected to a vehicle battery per predetermined time period is smaller than a predetermined value, and when the variation in output voltage on the output terminal connected to the vehicle battery per predetermined time period is smaller than the predetermined value, then determine that it is time to start the synchronous rectification.

9. The rotary electric machine according to claim 1, wherein the on/off-timing setter is further configured to set the off-timing for each switching element of the pair of the upper-arm and lower arm switching elements not only after, but also before the synchronous rectification is started, the synchronous control start determiner is further configured to determine whether or not a time period from the off-timing of the upper-arm switching element to the end of the upper-arm on-period and a time period from the off-timing of the lower-arm switching element to the end of the lower-arm on-period are both larger than a predetermined value, and when the time period from the off-timing of the upper-arm switching element to the end of the upper-arm on-period and the time period from the off-timing of the lower-arm switching element to the end of the lower-arm on-period are both larger than the predetermined value, then determine that it is time to start the synchronous rectification.

10. The rotary electric machine according to claim 1, wherein the on/off-timing setter determines a start of the upper-arm on-period as on-timing of the upper-arm switching element and timing before an end of the upper-arm on-period as off-timing of the upper-arm switching element, and determines a start of the lower-arm on-period as on-timing of the lower-arm switching element and timing before an end of the lower-arm on-period as off-timing of the lower-arm switching element.

11. The rotary electric machine according to claim 1, wherein each switching element is a MOS transistor, and the diode electrically connected in parallel with the switching element is a parasitic diode of the MOS transistor.

12. The rotary electric machine according to claim 11, wherein for each pair of the plurality of pairs of upper-arm and lower-arm MOS transistors a drain terminal of the upper-arm MOS transistor is connected to a positive terminal of a vehicle battery, a source terminal of the upper-arm MOS transistor is connected to a drain terminal of the lower-arm MOS transistor, a source terminal of the lower-arm MOS transistor is connected to a negative terminal of the vehicle battery that is at a ground voltage level, and the corresponding phase-winding is connected to the upper-arm and lower-arm MOS transistors between the source terminal of the upper-arm MOS transistor and the drain terminal of the lower-arm MOS transistor, and wherein the first threshold is set higher than the positive terminal voltage of the battery plus a drain-source on-voltage of the upper-arm MOS transistor and lower than the positive terminal voltage of the battery plus a forward voltage of the diode connected in parallel with the upper-arm MOS transistor, the second threshold is set lower than the positive terminal voltage of the battery, the third threshold is set lower than the negative terminal voltage of the battery minus a drain-source on-voltage of the lower-arm MOS transistor and higher than the negative terminal voltage of the battery minus a forward voltage of the diode connected in parallel with the lower-arm MOS transistor, the fourth threshold is set higher than the negative terminal voltage of the battery.

\* \* \* \* \*